United States Patent [19]

Gergely et al.

[11] Patent Number: 5,831,123
[45] Date of Patent: Nov. 3, 1998

[54] PROCESS FOR PRODUCING A GRANULATED MATERIAL

[75] Inventors: Gerhard Gergely, Gartengasse 8, A-1053 Wien, Austria; Wolfram Tritthart, Wolfsberg, Austria

[73] Assignee: Gerhard Gergely, Wien, Austria

[21] Appl. No.: 632,508

[22] PCT Filed: Nov. 12, 1994

[86] PCT No.: PCT/EP94/03763

§ 371 Date: Jun. 4, 1996

§ 102(e) Date: Jun. 4, 1996

[87] PCT Pub. No.: WO95/13130

PCT Pub. Date: May 18, 1995

[30] Foreign Application Priority Data

Nov. 12, 1993 [CH] Switzerland .............................. 3403/93

[51] Int. Cl.⁶ .......................... C07C 59/265; A61K 9/46; A61K 9/14
[52] U.S. Cl. .......................... 562/584; 424/466; 424/489; 426/96; 53/205; 127/21; 423/419.1; 423/422; 423/421; 75/10.57
[58] Field of Search .............................. 562/584; 53/205; 426/96; 108/446; 1/64.02, 64.03; 127/21; 75/10.57; 423/419.1, 422, 421; 424/466, 489

[56] References Cited

U.S. PATENT DOCUMENTS

| | | | |
|---|---|---|---|
| 3,101,040 | 8/1963 | Lanz | 99/235 |
| 3,340,018 | 9/1967 | Otrhalek | 23/313 |
| 4,678,661 | 7/1987 | Gergely et al. | 424/44 |
| 4,876,802 | 10/1989 | Gergely et al. | 34/15 |
| 4,911,930 | 3/1990 | Gergely et al. | 424/466 |

FOREIGN PATENT DOCUMENTS

| | | |
|---|---|---|
| A-0 196 884 | 10/1986 | European Pat. Off. . |
| B-0 188 390 | 4/1989 | European Pat. Off. . |
| A-31 49 517 | 7/1982 | Germany . |
| A-34 43 210 | 5/1986 | Germany . |
| WO-86/07547 | 12/1986 | WIPO . |

*Primary Examiner*—Gary Geist
*Assistant Examiner*—Rosalynd Keys
*Attorney, Agent, or Firm*—Oliff & Berridge, PLC

[57] ABSTRACT

A process for producing a granulated material from a powder mixture containing at least two components, one of which is in crystal or crystalline form and at least one contains water of crystallization and/or is reactive, granulation is carried out in an inclined drum. Powder is fed in at one end and granulate removed at the other, after being transported inside the drum for a desired period while the drum is rocked in a way which largely eliminates shear forces. A quantity of liquid at least approximately equal to the quantity of water of crystallization present and sufficient for the formation of a superficially active solution adhesive is released inside the drum, where appropriate by partial reaction of the reactive component(s), after which the powder mixture components are granulated by surface adhesion.

22 Claims, 1 Drawing Sheet

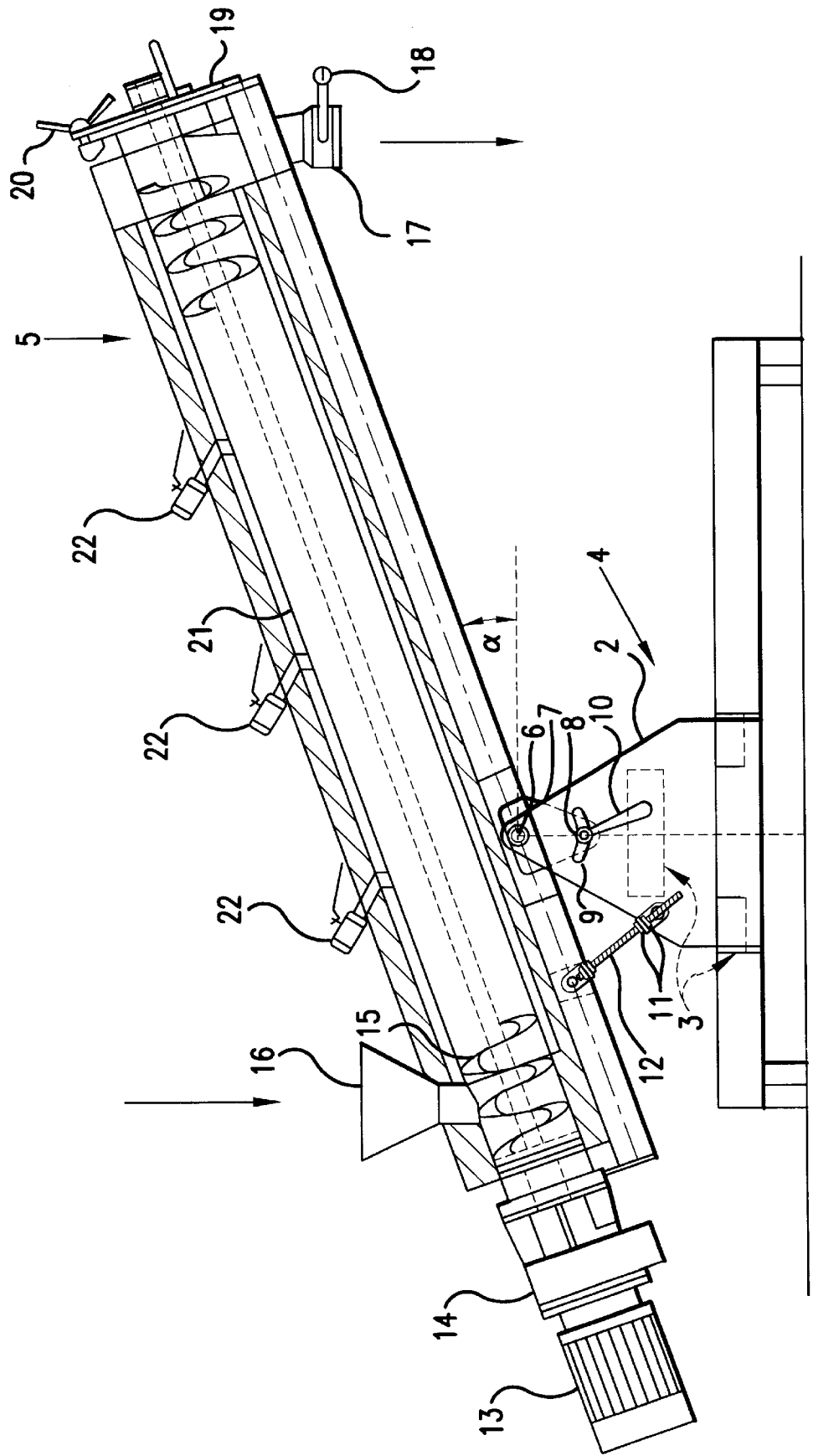

PROCESS FOR PRODUCING A GRANULATED MATERIAL

BACKGROUND OF THE INVENTION

The invention relates to a process for continuously producing a granulated material from a powder mixture comprising at least two components.

Such a process is described, for example, in CH-A-478 591. This prior art states that wet granulation can scarcely be carried out, particularly in the case of reactive components of a powder. It is therefore said to be difficult to granulate, for example, zinc white without a binder. This publication envisages the solution as a cold granulation utilizing adhesive forces which are to be generated by deflecting the powder by baffles and by other purely mechanical means.

In practice, such a process proves to be very unreliable, and a uniform particle size of the resulting granulated material is also not ensured. It is therefore the object of the invention to design a process of the type stated at the outset so that relatively large amounts of granulated material can be obtained in a satisfactory quality by means of said process. According to the invention, this is achieved in a surprisingly simple manner by surface adhesion of the components of the powder mixture with the aid of water as a superficially active adhesive solution, as described below.

WO 86/07547, the most closely related prior art, describes a process for producing granules of effervescent powder, wherein a hot air stream is forced over or through the powder mixture and is intermittently sucked off again. The powder mixture is first dried by dry or slightly moist hot air and application of reduced pressure and is then adhesively bonded at the surface by treatment with hot steam and the consequent partial reaction of the powder components with one another, for example citric acid with calcium carbonate to give calcium citrate. This process with its extremely difficult humidity adjustment could be carried out to date only in batch operation, with one or more moistening and drying phases performed in succession.

In comparison, the present invention constitutes a remarkable improvement of moist granulation. According to the basic continuous process for producing granulated material from a powder mixture and the various embodiments described herein, the water required for the surface adhesion is liberated inside the drum, optionally by a partial reaction of the relative component(s) of the powder mixture.

This solution is surprising for several reasons. On the one hand, the teaching according to the invention is precisely contradictory to that of the stated prior art, which wanted as far as possible to avoid moisture, in fact just to avoid reactions. On the other hand, the invention deliberately starts from a reaction, albeit only a partial one, of the reactive components, namely to an extent such that the superficial accumulation of the components, i.e. the granulation, can be carried out.

On the other hand, complete reaction of the reactive components must be feared in many cases, as was evidently also by the author of the above-mentioned prior art. The invention is therefore also based on the knowledge that this effect does not occur if water or the liquid partially triggering the reaction is used only in such small amounts that they at least approximately correspond to the amount of water of crystallization of at least one of the powder components. In individual cases, it may even be possible to exceed these small amounts by about 100%, for example by external supply of moisture.

It is here that a third surprising feature is also encountered, since the difficulty of controlling the reaction has to date prevented those skilled in the art from arriving at a continuous, and hence more economical, process. Particular effervescent granules were first prepared batchwise on tray dryers or in separate fluidized beds of the acidic and the basic component, or in a vacuum granulator. High daily outputs were therefore virtually impossible to achieve. This problem of the control of the reaction, and hence the possibility of a continuous and economical process, is solved by the measures according to the invention.

SUMMARY OF THE INVENTION

In general, however, the process according to the invention has a dual effect in that, on the one hand, coating of the carrier takes place as a result of the partial reaction, but this in turn promotes classical pelletization, with the result that any abraded particulate material is likewise fed to the granulation, which in the end leads to a relatively narrow particle size distribution and increases the cost efficiency owing to the reduction of the abrasion losses and sieving losses.

The present invention therefore relates to a process for continuously producing granulated material from a powder mixture comprising at least two components, the granulation being effected in a drum inclined relative to the horizontal, by introducing the powder at one end and removing the granulated material at the other end, whereas it is forcibly transported inside the drum during a desired residence time with execution of a rocking movement with substantial avoidance of shear forces.

BRIEF DESCRIPTION OF THE DRAWINGS

FIG. 1 depicts an exemplary drum granulator for use in conjunction with the present invention.

DETAILED DESCRIPTION OF PREFERRED EMBODIMENTS

It is essential that at least one component of the powder mixture is present in the form of crystals or in crystalline form and that at least one component contains water of crystallization or at least one component is reactive. It is also essential that an amount of liquid which at least approximately corresponds to the amount of water of crystallization and is sufficient for the formation of a superficially active adhesive solution is liberated inside the drum optionally by expulsion of the water of crystallization by an increase of temperature and/or by a partial reaction of the reactive component(s) of the powder mixture—so that the components of the powder mixture then undergo granulation by surface adhesion.

In order to be able to establish as exactly as possible and to control the required small amounts of liquid, for example, warming or heating of the powder mixture may be a decisive advantage for expelling at least a part of the water of crystallization of that or those component(s) of the powder mixture which contains or contain water of crystallization.

In addition or alternatively, however, the liberation of at least a part of the water required for the reaction can also be achieved by at least partial reaction of the powder components with one another. Such a partial reaction can take place when the powder mixture contains at least one acidic component, preferably an organic acid, such as, for example, citric acid, tartaric acid, malic acid, fumaric acid, adipic acid or a mixture thereof, and at the same time also at least one alkaline component, for example an alkali metal carbonate or alkaline earth metal carbonate. The acid/base reaction results in the formation of a, preferably acidic, salt with elimination of water and permits the superficial adhesion of the powder components to give granulated materials. Such a powder mixture which releases precalculable amounts of liquid during reaction of the components with one another is, for example, an effervescent powder mixture.

In certain cases, it may be advantageous if, instead of the organic acid or in addition to the organic acid, at least one other proton donor, for example sodium hydrogen phosphate, sodium dihydrogen pyrophosphate or sodium bisulphite, together with at least one alkaline component, preferably an alkali metal carbonate or alkaline earth metal carbonate or alkali metal bicarbonate or alkaline earth metal bicarbonate, is initially taken in the powder mixture.

Although the use of the water of crystallization itself and the expulsion thereof by warming or heating, preferably to temperatures of 30°–85° C., in particular 50°–75° C. and optionally 65° C.±10%, are preferred, it may be advantageous for some powders if an adhesive solution is additionally supplied externally in order thus to initiate or to support the reactive granulation. For this purpose, an amount of additional liquid, such as water, alcohol, or water/alcohol mixture, an alkali solution and/or an alkaline earth solution, corresponding at least approximately to the amount of water of crystallization is sprayed in via nozzles or atomizers in very finely divided form or is added in vapour form, in the region of the powder inlet end of the drum.

In the case of the special form of alcohol metering, for example of a suitable alcohol, optionally as a mixture with water, the powder mixture contains at least one acidic component which releases water on reacting with the alcohol, so that the amount of liquid which is required for the formation of a superficially acting adhesive solution is at least partially produced by the reaction of the added alcohol with the acidic component. This reaction can optionally also be carried out with participation of a suitable catalyst, preferably of a proton donor, in particular small amounts of a mineral acid. Depending on the type of catalyst, it may be either initially taken as a powder component in the powder mixture or metered in externally in suitable form—preferably in an aqueous solution. In addition, the amount of water of crystallization may also be adjusted, by, for example, admixing a part of a powder component in the anhydrous state and another part in a form containing water of crystallization.

For some applications, in particular for effervescent powders, it is particularly advantageous if the powder mixture, in particular citric acid with an alkali metal carbonate or alkaline earth metal carbonate, is converted at least partially, for example to 20–50%, into an acidic salt. The formation of poorly soluble, secondary and tertiary salts is thus avoided.

It is however clear that the invention although preferably used for effervescent powders—is by no means restricted to them but can be used wherever reactive components are to be granulated.

It is furthermore clear that the control of the reaction taking place in the drum is of decisive importance. An important means to this end has already been mentioned, namely the amount of liquid required for formation of a tacky phase as the "granulating aid".

Further details of the invention are evident from the following description of an apparatus shown schematically in the only FIGURE of the drawing and intended for carrying out the process according to the invention, and from the Examples discussed below.

BRIEF DESCRIPTION OF DRAWING

The FIGURE shows a drum granulator as used for carrying out the subsequently explained embodiments, in side view and partly in section. It is clear, however, that the invention is by no means restricted to the type of drum granulator shown but that the invention relates to a large number of possible modifications, which will be referred to individually.

A stationary drum 5 is pivotably fastened on a stand 4 consisting of a pedestal 1, side walls 2 and transverse spars 3 indicated by dashed lines. For this purpose, a rocker shaft 6 is fastened on the side walls 2, a sector 7 being rigidly connected to said rocker shaft. The lower end of the sector 7 carries a pin or bolt 8 which passes through an arc-shaped slot 9 in the side wall 2. The end of the bolt 8 is provided with a thread (not shown) which is engaged by an internal thread of a clamping lever 10 so that, during adjustment of its rocking position, the drum 5 can be temporarily clamped with the aid of the clamping lever 10.

For such an adjustment, the nuts 11 on a tie-bar 12 are slackened and, after adjustment of the angle of inclination of the drum 5, are tightened again so that the drum 5 is held on the stand in a stable position. It is therefore advantageous if the rocker shaft 6 is arranged at least approximately at the axis passing through the centre of gravity of the drum 5, which axis here is displaced relatively far to the left—based on the FIGURE—because a motor 13 together with step-down gear 14 is fastened at the left end.

This motor 13 serves for driving a screw 15 which is rotatably mounted in the interior of the drum 5 and moves powder which is to be granulated and which is filled via a hopper 16 upwards towards an outlet nozzle 17 which can optionally be closed by means of a pivoted pusher and lever 18 connected thereto. For cleaning the drum, the upper bearing cover 19 is preferably detachably fastened by means of wing nuts 20. The resulting angle of inclination α of the drum 5 is in general about 20°–40° relative to the horizontal, but may optionally also be set smaller. In the case of angles above 45°, it is possible that the powder will no longer be transported inside the drum 5 by the screw 15 and a certain back-flow will take place, although this may also be desired because as a result granulated materials formed further above can roll back into the lower part and can act as initiators there.

Two procedures are possible for filling the drum 5. Either the powder is introduced or, by appropriate adjustment of the speed of the screw 15, is removed only in an amount such that the inner base of the drum is covered at most to the height of the screw flights, i.e. up to the internal diameter of the screw blades, which is preferred. In this case, the residence time of the powder inside the drum 5 is exactly determined by the screw speed.

The other possibility is that the above-mentioned back-flow of granulated materials for initiation is intentionally promoted by more vigorous filling of the drum 5, although this leads to a broad residence time spectrum and may make the latter difficult to control in the case of certain types of reaction. In this connection, it is also possible to influence the residence time of the powder mixture or of the granulated materials in the drum 5 by the geometric shape of the mechanical transport means, for example of the conveyor screw. Thus, it is possible to achieve a more or less well defined back-flow of granulated material and to control said back-flow in the desired manner, for example by means of orifices or passages in the screw blades.

Where this description refers to a "powder" which is introduced by the feed hopper, it is to be understood that this provides no information about its particle size but that, rather, it is also possible to introduce granular material such as, for example, pregranulated materials; the term "powder" is to be understood here in this sense.

The speed of the screw 15 is generally adjusted so that a residence time of 2 to 12 minutes, preferably 3 to 10 minutes, results. Thus, the average velocity of the individual particles in a granulating drum of conventional size is 0.3 to 1.0 cm/s, preferably in the range from 0.4 to 0.8 cm/s. The same possibilities also arise with the use of a rotary drum having stationary or counter-rotating mixing and transport means, for example a conveyor screw.

Whether the degree of filling, inclination of the drum, speed of the drum and/or the transport means, geometry of the transport means or a combination thereof is used for controlling the residence time depends not least also on the composition of the powder mixture and on the temperature chosen for the reaction (which may be exothermic or endothermic).

In general, it is expedient to supply heat at least in the feed zone of the drum 5. Although it is also possible to use rotating drums for the purposes of the invention, which drums may then be equipped with a burner projecting into the interior of the drum, for example as described in DE-B-1257747, with infrared or microwave radiators extending in the interior of the drum over the length of the latter, or with a double jacket for heating by means of a heating fluid (for example via a rotary inlet in the region of the longitudinal axis), as described in U.S. Pat. No. 3,101,040, it is clear that a stationary drum is particularly advantageous with regard to heating, because the supply of heat energy is thus simplified.

On the other hand, this means that the flights of the screw 15 must then move relative to the inner walls of the drum if it is intended to use force transport and not to rely only on a drum inclination, optionally also directed downwards, for transporting the powder. This relative movement of the screw 15 with respect to the inner walls of the drum means that, owing to tolerances, powder can enter between the screw blades and the drum wall, which may then lead to a relatively large amount of undesired fine particles. This can be counteracted either by equipping the screw with an appropriate seal on the outer circumference of its screw blades, as is known in industry, or by in fact relying on a rotating drum which contains the screw flights fixed in its interior, as is the case, for example, in CH-A-478591, already mentioned. In general, however, present-day technologies (for example the production of the interacting parts of screw 15 and/or drum 5 by means of laser processing) can be used for achieving such small tolerances that the use of the stationary drum 5 described also presents no problem.

In the present case, electrical heating of the drum 5 is therefore used, by placing a heating mat 21 in three sections, separated from one another, around the stationary drum 5. Each of the sections has a separate and separately adjustable energy supply means 22, so that different temperatures can be established inside the drum 5, over its length.

Where this description refers to various possibilities of adjustment, such as those of the angle α, of the screw speed or of the temperature, it is understood that the invention is by no means restricted thereto, especially since the setting can in fact remain constant for a certain product to be processed. On the other hand, it is advisable to mount adjustment facilities if a change of the products to be processed is desired.

The heating mat 21 may be of any desired type. For example, fabricated woven fabrics comprising carbon fibres and having good efficiency are offered on the market in Russia. However, conventional mats provided with heating wires may also be used. Temperatures in the interior of the drum 5 are produced with these or an alternative heating means, which temperatures are intended, in a preferred embodiment, especially to expel the water of crystallization of at least one component and thus to initiate a specific and controlled partial reaction and/or to allow such a reaction to take place, said reaction resulting in a tacky surface of the particles and causing or promoting the granulation. However, these temperatures may also be chosen so that a liquid-releasing partial reaction is initiated, resulting in the same effect. The heating is therefore preferably carried out to a temperature which exceeds 30° C., in particular to at least 50°, expediently to a temperature of 55° C. to 85° C., optionally to 65° C.±10%. At higher temperatures, there is a danger that the evaporation will take place too rapidly so that the liquid expelled or obtained by the reaction is no longer available in a sufficient amount. On the other hand, it is precisely a stationary drum 5 which makes it possible in a particularly simple manner to feed in a small amount of liquid, such as water and/or alcohol, for initiation of the reaction by means of appropriate nozzles, for example in the feed zone, close to the hopper 16 or just after it. Examples of such drum constructions having spray nozzles are to be found in the abovementioned DE-B-1257747, in EP-B-0188390 or in U.S. Pat. Nos. 3,101,040 and 3,340,018.

In this way, it may be assumed that mixing and homogenization of the powder components with simultaneous heating initially take place in the first, lowermost part of the drum 5. This is assisted by the fact that, at least in this zone, the screw blades are provided in the manner shown (held by arms not shown) with passages which run radially inwards and permit powder particles to pass from one compartment created by the screw into the other compartment. The screw 15 may optionally also have gaps over its circumference in this zone, so that the screw blades extend arc-like only over a part of the circumference and a space remains in between in each case, as is known per se for mixer screws.

As a rule, liquid, in general water, is liberated at the end of the first and at the beginning of the second third, so that it is also optimally distributed and there is no danger of agglomeration—a further advantage of the process according to the invention, which process avoids liquid accumulation precisely in this manner. The granulation now takes place with continuous rolling of the particles, which granulation should be complete by the end of the third third of the length of the drum 5. If necessary, heating of this last third can therefore be dispensed with.

Thereafter, the granulated material emerging from the nozzle 17, possibly after a sieving process for separating off undersize and optionally also oversize particles, is either filled as such into bags or is also fed to a tabletting press and compressed to give tablets. Owing to the narrow particle size distribution achievable by the process according to the invention, the sieving can if necessary even be dispensed with, which constitutes a further advantage of the process according to the invention. If desired, however, a second granulation process is also carried out if only the effervescent mixture is initially granulated in order to be subsequently processed with the respective intended additives in a second operation to give the finished granulated materials.

EXAMPLES

The following Examples were carried out with the aid of a drum according to the drawing, the throughput velocity being set at about 0.65 cm/s. This resulted in each case in a residence time of the individual particles of 2½ to 4 min. The temperature in the drum-like reactor was 70°±10° C. Only granulated base materials were prepared, to which, if desired, appropriate additives and/or active ingredients can be added in a further operation in order to produce finished granulated materials. In both cases, the water required for reaction granulation resulted on the one hand from the water of crystallization of the component added as acid in the crystalline state and on the other hand from the reaction of the carbonate, the reaction being controllable, practically stoichiometrically, by means of the temperature and the proportion of the component present in crystalline form.

Example 1

850 g of sodium bicarbonate, 2280 g of anhydrous citric acid (crystalline), 150 g of pulverulent citric acid (containing about 14 g of $H_2O$ as water of crystallization) and 200 g of sodium carbonate were premixed and were gradually introduced into the feed hopper 16 of the drum 5. After only 4 min, the total amount was obtained as granulated material at the nozzle 17. The drum 5 was then opened and cleaned, only small dust-residues of the powder being present therein.

Example 2

2500 g of calcium carbonate, 1050 g of pulverulent citric acid (containing about 98 g of $H_2O$ as water of crystallization) and 3324 g of anhydrous citric acid were introduced in the premixed state into the hopper 16. After production of the granulated material, the latter was subjected to a sieve analysis:

| Particle size (mm) | Proportion (%) |
| --- | --- |
| >0.710 | 11.2 |
| 0.500–0.710 | 16.6 |
| 0.355–0.500 | 31.4 |
| 0.250–0.355 | 24.7 |
| 0.100–0.250 | 12.7 |
| <0.100 | 3.4 |

Comparative Example

For comparison, mixtures A and B of the same composition as in Example 2 were processed by a conventional method (batch process). Mixture B additionally contained 300 mg of malic acid. The results of the sieve analysis:

| Particle size (mm) | Mixture A Proportion (%) | Mixture B Proportion (%) |
| --- | --- | --- |
| >0.710 | 5.3 | 4.6 |
| 0.500–0.710 | 4.0 | 3.3 |
| 0.355–0.500 | 16.8 | 17.3 |
| 0.250–0.355 | 20.9 | 21.7 |
| 0.100–0.250 | 23.8 | 23.2 |
| <0.100 | 28.6 | 29.4 |

In comparison to the sieve analysis of Example 2, it emerges that a clear peak is to be found there in the range 0.355–0.500, which corresponds to the desired granule size. On the other hand, the values of the Comparative Example are shifted towards the smaller particle sizes so that it is evident that there is a relatively large proportion of 28.6 and 29.4% of fine particles <0.100 mm, which also accounts for the relatively largest proportion of all fractions. This shows that not only fine particles to be removed by sieving are avoided to a high degree by the process according to the invention but that there is also a higher yield of useful granulated materials and hence higher cost efficiency of the process, which helps to ensure that far larger production quantities are achievable.

Although the invention was illustrated with reference to embodiments, as would be used particularly for producing effervescent powders, it is also clear from the above that it would be entirely possible to produce the granulated base materials discussed only for the purpose of binding material which is difficult to granulate and is inert per se to give granules, so that a large number of products can be produced by means of the process according to the invention.

Furthermore, it is clear that it may be sufficient to introduce only a single component of a powder mixture into the feed hopper, whereas the other component, for example for initiating the granulation process, is sprayed into the interior of the drum 5.

Within the scope of the invention, it would also be possible to regulate the reaction conditions, i.e. the screw speed, the inclination of the drum 5, the amount of added material containing water of crystallization and/or the temperature, the formation of granulated material serving as a determining factor. This can be determined by subsequent sieving and weighing or, more simply, by an optical method, for example by means of spectral analysis and/or image evaluation, as is known per se.

What is claimed is:

1. A process for continuously producing granulated material from a powder mixture comprising at least two components, the process comprising introducing the powder at one inlet end of a drum, wherein said drum is inclined relative to the horizontal;

granulating said powder in said inclined drum to yield granulated material; and removing the granulated material at a removal end of said drum, wherein said powder is forcibly transported inside the drum during a desired residence time with substantial avoidance of shear forces, wherein at least one said component is present in crystalline form, wherein at least one said component contains water of crystallization or is reactive to produce reaction water or both, and wherein at least one of said reaction water and said water of crystallization in an amount sufficient for formation of a superficially active adhesive solution is liberated inside the drum and forms a superficially active adhesive solution, whereupon the components of the powder mixture are allowed to undergo granulation by surface adhesion.

2. The process according to claim 1, wherein the powder mixture is heated for at least partial expulsion of the water of crystallization.

3. The process according to claim 1, wherein at least one said component is reactive, wherein the powder mixture contains at least one alkaline and at least one acidic component, and wherein at least a part of the water required for formation of said adhesive solution is being formed by at least partial reaction of the components with one another.

4. The process according to claim 1, wherein at least one organic acid, at least one proton donor, or a mixture thereof and at least one alkaline component are initially provided in the powder mixture.

5. The process according to claim 1, wherein the powder mixture is at least partially reacted to give an acidic salt.

6. The process according to claim 1, wherein an amount of additional liquid selected from the group consisting of water, alcohol, a water/alcohol mixture, an alkali solution, an alkaline earth solution, and an alkali/alkaline earth solution mixture is additionally sprayed in via nozzles or atomizers or added in vapor form, in a region of the inlet end of the drum.

7. The process according to claim 6, wherein the powder mixture contains at least one acidic component which releases water on reaction with alcohol, and the amount of liquid required for formation of a superficially active adhesive solution is produced at least partially by the reaction of the added alcohol with the acidic component.

8. The process according to claim 1, wherein the drum is inclined at an angle ($\alpha$) of about 20°–40° relative to the horizontal.

9. The process according to claim 1, wherein the residence time of the powder mixture is set at about 2 to 12 minutes.

10. The process according to claim 1, wherein the powder or the granulated material is transported by a mechanical conveyer means and a stationary drum having rotating conveyer means or a rotating drum having stationary or counter-rotating conveyer means.

11. The process according to claim 10, wherein the residence time of the powder mixture or of the granulated material inside the drum is established by the degree of filling, the speed of the drum, the speed of the conveyer means, the geometry of the conveyer means, the inclination of the drum or a combination thereof.

12. The process according to claim 10, wherein the granulated material is dried and optionally then compressed to give tablets.

13. The process of claim 3, wherein the acidic component is selected from the group consisting of citric acid, tartaric acid, malic acid, an alkali salt thereof, and an alkaline earth salt thereof.

14. The process of claim 3, wherein said alkaline component is selected from the group consisting of alkali metal carbonates and alkaline earth metal carbonates.

15. The process of claim 3, wherein said alkaline earth metal carbonates are bicarbonates.

16. The process of claim 4, wherein the proton donor is selected from the group consisting of sodium dihydrogen phosphate, sodium dihydrogen pyrophosphate and sodium bisulphite.

17. The process of claim 5, wherein said powder mixture is reacted to 20–50% to give said acidic salt.

18. The process of claim 7, wherein the reaction takes place with participation of a catalyst.

19. The process of claim 8, wherein the drum is inclined upwards from the inlet to the removal end.

20. The process of claim 10, wherein said mechanical conveyor means is a conveyor screw.

21. The process of claim 12, wherein said granulated material is dried in vacuo.

22. The process of claim 1, wherein said drum executes a rocking movement.

* * * * *